US011097609B2

(12) United States Patent
Matsuda et al.

(10) Patent No.: US 11,097,609 B2
(45) Date of Patent: Aug. 24, 2021

(54) HYBRID VEHICLE

(71) Applicant: KAWASAKI JUKOGYO KABUSHIKI KAISHA, Kobe (JP)

(72) Inventors: Yoshimoto Matsuda, Kobe (JP); Hirokazu Morita, Kakogawa (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 28 days.

(21) Appl. No.: 16/495,948

(22) PCT Filed: Feb. 28, 2018

(86) PCT No.: PCT/JP2018/007595
§ 371 (c)(1),
(2) Date: Sep. 20, 2019

(87) PCT Pub. No.: WO2018/173672
PCT Pub. Date: Sep. 27, 2018

(65) Prior Publication Data
US 2020/0139803 A1 May 7, 2020

(30) Foreign Application Priority Data

Mar. 22, 2017 (JP) .............................. JP2017-055805

(51) Int. Cl.
B60K 6/48 (2007.10)
B60L 50/16 (2019.01)
(Continued)

(52) U.S. Cl.
CPC .................. B60K 6/48 (2013.01); B60K 6/40 (2013.01); B60L 50/16 (2019.02);
(Continued)

(58) Field of Classification Search
CPC .............. B60K 6/48; B60K 6/40; B60L 50/16
See application file for complete search history.

(56) References Cited

U.S. PATENT DOCUMENTS 6,299,563 B1 * 10/2001 Shimasaki ............. B60K 6/547
477/5
10,544,863 B2 * 1/2020 Takahashi ............... F16H 63/18
(Continued)

FOREIGN PATENT DOCUMENTS

JP H08133163 A 5/1996
JP 2005330844 A 12/2005
(Continued)

Primary Examiner — Erez Gurari
(74) Attorney, Agent, or Firm — Alleman Hall Creasman & Tuttle LLP

(57) ABSTRACT

A hybrid vehicle includes: an internal combustion engine; an electric motor; a transmission including an input shaft that receives power inputted from the internal combustion engine and the electric motor and an output shaft that outputs power to a drive wheel; and a power cutting-off mechanism configured to cut off a power transmission route between the internal combustion engine and the output shaft, wherein the electric motor is connected to a rotating member provided on the output shaft in such a manner that the electric motor transmits power to the output shaft at a location downstream of the power cutting-off mechanism.

12 Claims, 7 Drawing Sheets

(51) Int. Cl.
  *B60K 6/40* (2007.10)
  *B62K 11/04* (2006.01)
(52) U.S. Cl.
  CPC ....... *B60L 2200/12* (2013.01); *B60Y 2200/12* (2013.01); *B62K 11/04* (2013.01)

(56) References Cited

U.S. PATENT DOCUMENTS

| | | | | |
|---|---|---|---|---|
| 2007/0235235 | A1* | 10/2007 | Fukami | B60K 6/40 |
| | | | | 180/65.6 |
| 2008/0035397 | A1* | 2/2008 | Tanaka | B60K 6/00 |
| | | | | 180/65.31 |
| 2009/0199815 | A1* | 8/2009 | Fukami | B60K 6/485 |
| | | | | 123/399 |
| 2010/0236856 | A1* | 9/2010 | Nomura | B60K 6/48 |
| | | | | 180/292 |
| 2013/0081895 | A1* | 4/2013 | Nomura | B60L 50/15 |
| | | | | 180/220 |
| 2014/0238758 | A1* | 8/2014 | Barth | B60K 6/547 |
| | | | | 180/65.25 |
| 2017/0067560 | A1* | 3/2017 | Takahashi | B62M 7/02 |
| 2017/0088213 | A1* | 3/2017 | Hanawa | B60K 6/38 |
| 2019/0232950 | A1* | 8/2019 | Atluri | B60W 30/18145 |
| 2020/0139803 | A1* | 5/2020 | Matsuda | B60K 6/40 |
| 2020/0173341 | A1* | 6/2020 | Matsuda | B60W 10/30 |
| 2020/0189566 | A1* | 6/2020 | Yanase | B60K 6/26 |
| 2020/0317293 | A1* | 10/2020 | Nishiyabu | B60K 6/383 |

FOREIGN PATENT DOCUMENTS

| | | |
|---|---|---|
| JP | 2007269253 A | 10/2007 |
| JP | 2012228923 A | 11/2012 |
| JP | 2015077887 A | 4/2015 |
| WO | 2016203452 A1 | 12/2016 |

\* cited by examiner

|  | TRANSMISSION | CLUTCH | ENGINE | MOTOR |
|---|---|---|---|---|
| ENGINE-MOTOR-DRIVEN TRAVEL MODE | ENGAGED | ENGAGED | OPERATED FOR TRAVEL | OPERATED FOR TRAVEL (REGENERATION) |
| ENGINE-DRIVEN TRAVEL MODE | ENGAGED | ENGAGED | OPERATED FOR TRAVEL | FREE RUN (REGENERATION) |
| MOTOR-DRIVEN TRAVEL MODE | DISENGAGED | DISENGAGED | — | OPERATED FOR TRAVEL (REGENERATION) |

Fig.4

HYBRID VEHICLE

TECHNICAL FIELD

The present invention relates to a hybrid vehicle including an internal combustion engine and an electric motor as power sources for travel of the vehicle.

BACKGROUND ART

Patent Literature 1 discloses a hybrid vehicle configured to drive a drive wheel using not only power of an internal combustion engine but also power of an electric motor.

CITATION LIST

Patent Literature

Patent Literature 1: Japanese Laid-Open Patent Application Publication No. 2007-269253

SUMMARY OF INVENTION

Technical Problem

However, in the hybrid vehicle of Patent Literature 1, the electric motor is connected to a crankshaft of the internal combustion engine and, unfortunately, pumping loss occurs during operation of the electric motor due to the internal combustion engine causing resistance.

It is therefore an object of the present invention to reduce energy loss that occurs when a drive wheel is driven by an electric motor alone and achieve the reduction in energy loss with a simple configuration.

Solution to Problem

A hybrid vehicle according to an aspect of the present invention includes: an internal combustion engine; an electric motor; a transmission including an input shaft that receives power inputted from the internal combustion engine and the electric motor and an output shaft that outputs power to a drive wheel; and a power cutting-off mechanism configured to cut off a power transmission route between the internal combustion engine and the output shaft, wherein the electric motor is connected to a rotating member provided on the output shaft in such a manner that the electric motor transmits power to the output shaft at a location downstream of the power cutting-off mechanism.

With this configuration, when the electric motor is in operation, transmission of power from the electric motor to the crankshaft of the internal combustion engine can be prevented by cutting off the power transmission route between the internal combustion engine and the output shaft using the power cutting-off mechanism (e.g., a neutral shift mechanism of the transmission or a clutch), and for this purpose the power cutting-off mechanism disposed between the internal combustion engine and the output shaft can be used. This allows a reduction in energy loss occurring when power is transmitted from the electric motor to the rotating member (e.g., a gear or sprocket) provided on the output shaft in order to drive the drive wheel by the electric motor alone, and the reduction in energy loss can be achieved with a simple configuration.

The hybrid vehicle may further include a sensor that detects which state the clutch is in or detects a command to actuate the clutch; and a controller that controls the electric motor based on an output from the sensor.

With this configuration, control of the electric motor can be accomplished according to the present state of the power transmission route or according to commands given by the driver concerning the power transmission state.

The electric motor may be separately provided outside a crankcase housing the transmission.

With this configuration, the basic vehicle structure can be standardized between the hybrid vehicle incorporating the electric motor and an internal combustion engine vehicle incorporating no electric motor.

The electric motor may be disposed above, or rearward of, a rear of a crankcase housing the transmission.

With this configuration, the influence of heat of the internal combustion engine on the electric motor can be reduced.

The hybrid vehicle may further include an output power transmission mechanism that transmits power from the output shaft to the drive wheel. An end portion of the output shaft may project to one side in a vehicle width direction from a crankcase housing the transmission, the output power transmission mechanism may be connected to the end portion of the output shaft, and the electric motor may input power to the end portion of the output shaft.

With this configuration, since the electric motor transmits power to the output shaft at a location outside the crankcase, components of the crankcase can be standardized between the hybrid vehicle incorporating the electric motor and an internal combustion engine vehicle incorporating no electric motor.

The electric motor may be disposed outside and away from the crankcase.

With this configuration, heat transfer from the crankcase to the electric motor can be reduced compared to when the electric motor is supported in contact with the crankcase.

The hybrid vehicle may further include a vehicle body frame including a pair of frame portions spaced apart from each other in a vehicle width direction, the electric motor may be disposed in such a manner that a drive shaft of the electric motor extends in the vehicle width direction, and opposite end portions of a casing of the electric motor in the vehicle width direction may be supported by the pair of frame portions.

With this configuration, supporting of the electric motor is simplified, and the casing of the electric motor can serve also as a reinforcing member coupling the pair of frame portions.

Advantageous Effects of Invention

According to the present invention, energy loss occurring when a drive wheel is driven by an electric motor alone can be reduced with a simple configuration.

BRIEF DESCRIPTION OF DRAWINGS

FIG. 4 is a table illustrating the respective states of a transmission, a clutch, an engine, and an electric motor of the vehicle of FIG. 1 in different modes.

DESCRIPTION OF EMBODIMENTS

Hereinafter, embodiments will be described with reference to the drawings.

Figure 1:
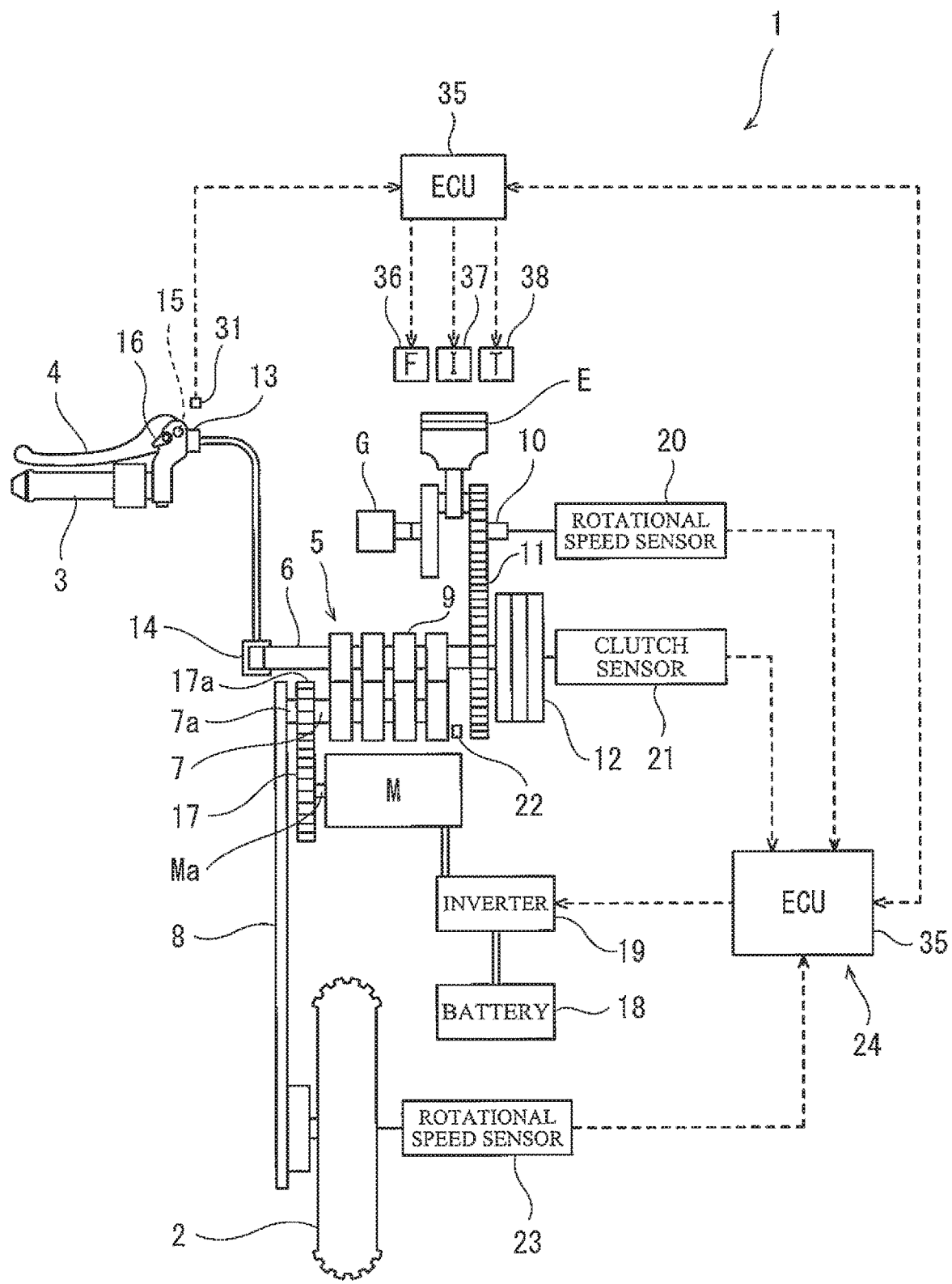
FIG. 1 is a block diagram of a hybrid vehicle according to an embodiment.

FIG. 1 is a block diagram of a hybrid vehicle 1 according to an embodiment. As shown in FIG. 1, the hybrid vehicle 1 is, for example, a motorcycle. The vehicle 1 includes an unillustrated driven wheel (front wheel) and a drive wheel 2 (rear wheel). The handle of the vehicle 1 includes a grip 3 equipped with a clutch operation member 4 (e.g., a clutch lever). The clutch operation member 4 is, for example, a clutch lever operated by a hand of the driver or a clutch pedal operated by a foot of the driver. The vehicle 1 includes an engine E (internal combustion engine) serving as a drive source for travel and as a drive source for electricity generation and an electric motor M serving as a drive source for travel and as an electricity generator.

The vehicle 1 includes a transmission 5 that provides a conversion from power received from the engine E and/or electric motor M and that transmits the converted power to the drive wheel 2. The transmission 5 includes an input shaft 6 and an output shaft 7. The input shaft 6 receives power inputted from the engine E and electric motor M. The output shaft 7 transmits power to the drive wheel 2 via an output power transmission mechanism 8 (e.g., a chain or a belt). The input shaft 6 is coupled to the output shaft 7 via a plurality of gear trains 9 having different reduction gear ratios so that power can be transmitted from the input shaft 6 to the output shaft 7.

The input-side gears of the gear trains 9 are fixed to the input shaft 6. The output-side gears of the gear train 9 are provided coaxially with the output shaft 7 and are rotatably fitted on the output shaft 7. The input-side gears and the output-side gears are constantly in mesh. The transmission 5 is a manual transmission that is mechanically associated with operations of a shift operation member (not illustrated) by a foot or hand of the driver and that selects one of the plurality of gear trains 9 to switch the power transmission route from one to another and accomplish gear shifting. In the transmission 5, one power transmission route is selected from among a neutral position and a plurality of gear positions (e.g., first to sixth gear positions).

The transmission 5 has a neutral position set as a position where no power is transmitted from the input shaft 6 to the output shaft 7 in a natural state where no power is applied by the driver. The driver can achieve non-transmission of power in the natural state by placing the transmission 5 into the neutral position.

The engine E includes a crankshaft 10 connected to the input shaft 6 of the transmission 5 via a first power transmission mechanism 11 (e.g., a gear) and a clutch 12 (e.g., a multi-plate clutch) so that power can be transmitted from the crankshaft 10 to the input shaft 6. That is, the clutch 12 is disposed in a power transmission route between the engine E and the input shaft 6. Once the clutch operation member 4 is moved to an operative position, the operation force applied by the driver is transmitted from a master cylinder 13 to a slave cylinder 14, from which the force is delivered as clutch actuation power to the clutch 12 via a rod inserted in the input shaft 6. As a result, the clutch 12 is brought into a disconnection state. When the clutch operation member 4 is in an inoperative position, no clutch actuation power is delivered to the clutch 12, and the clutch 12 is in an connection state. The handle is provided with a clutch operation sensor 31 that detects whether the clutch operation member 4 is in an operative state or inoperative state.

The clutch operation member 4 is provided with a biasing member 15 that biases the clutch operation member 4 from the operative position toward the inoperative position and a holding mechanism 16 configured to hold the clutch operation member 4 in the operative position. The biasing member 15 is, for example, a spring provided on a pivoting portion of the clutch operation member 4. The holding mechanism 16 is operable between a locking position and an unlocking position. Upon entering the locking position while the clutch operation member 4 is in the operative position, the holding mechanism 16 locks the clutch operation member 4 and holds the clutch operation member 4 in the operative position against the biasing member 15 without the need for the driver to operate the clutch operation member 4. Once the clutch operation member 4 enters the unlocking position, the clutch operation member 4 held in the operative position is returned to the inoperative position by the biasing member 15.

The electric motor M is connected to the output shaft 7 of the transmission 5 via a second power transmission mechanism 17. The second power transmission mechanism 17 may be a gear pair, a chain/sprocket mechanism, or a belt/pulley mechanism. That is, the drive shaft of the electric motor M is connected to a rotating member (e.g., a gear 17a) corotatable with the output shaft 7 so that power can be constantly transmitted from the drive shaft to the rotating member. When an endless belt or chain is used as the second power transmission mechanism 17, the electric motor M can be more easily disposed away from the output shaft 7 than when power transmission is established by means of a gear pair. The electric motor M inputs power to the output shaft 7 without the mediation of the input shaft 6. That is, the electric motor M transmits power to the output shaft 7 at a location downstream of the transmission 5 and clutch 12 (which serve as power cutting-off mechanisms capable of cutting off the power transmission route between the engine E and the output shaft 7) in the direction of power transmission from the engine E. The state of connection between the electric motor M and the output shaft 7 are constantly kept in a power transmission state.

An end portion 7a (e.g., a left end portion) of the output shaft 7 of the transmission 5 projects to one side (e.g., left side) in a vehicle width direction from a crankcase 29, and the output power transmission mechanism 8 is connected to the end portion 7a of the output shaft 7. The electric motor M inputs power to the end portion 7a of the output shaft 7 via the second power transmission mechanism 17. The point of connection between the output shaft 7 and the second power transmission mechanism 17 is located inward of the point of connection between the output shaft 7 and the output power transmission mechanism 8 in the vehicle width direction and located outward of the crankcase 29 in the vehicle width direction. The direction in which the drive shaft Ma of the electric motor M projects from a casing Mb of the electric motor M is the same as the direction in which the output shaft 7 of the transmission 5 projects from the crankcase 29. The electric motor M can generate power from electricity supplied from a battery 18 via an inverter 19, and also generate electricity from power transmitted from the output shaft 7 of the transmission 5 to charge the battery 18 with the generated electricity.

To the crankshaft 10 of the engine E is connected an electricity generator G provided separately from the electric motor M. The crankshaft 10 is equipped with an engine rotational speed sensor 20 (e.g., a crank angle sensor) capable of detecting the rotational speed of the crankshaft 10. The clutch 12 is equipped with a clutch sensor 21 (e.g., a stroke sensor) capable of detecting whether the clutch 12 is in a disconnection state or a connection state. The transmission 5 is equipped with a transmission sensor 22 capable of detecting the shift position (one position selected from the neutral position and the plurality of gear positions [e.g., first to sixth gear positions]) to detect a command given by the driver to shift the transmission 5. For example, the transmission sensor 22 is a potentiometer capable of detecting the rotation angle of the shift drum or a gear position sensor. The drive wheel 2 is equipped with a drive wheel rotational speed sensor 23 that detects the rotational speed of the drive wheel 2.

The vehicle 1 is equipped with a controller 24. The controller 24 receives output signals from the engine rotational speed sensor 20, the clutch sensor 21, the transmission sensor 22, the drive wheel rotational speed sensor 23, and the clutch operation sensor 31. The controller 24 controls the engine E and the electric motor M. The controller 24 includes an engine ECU 35 that controls the engine E and a motor ECU 33 that controls the electric motor M. The controller 24 does not need to be constituted by the ECUs 33 and 35 separate from each other and may be configured as a single unit.

The controller 24 includes a processor, a volatile memory, a non-volatile memory, an I/O interface, etc. The processor receives information from various sensors including the engine rotational speed sensor 20, clutch sensor 21, transmission sensor 22, and drive wheel rotational speed sensor 23 through the I/O interface. The processor refers to the received information and performs processing using the volatile memory according to a program stored in the non-volatile memory, thereby controlling the engine E and the electric motor M.

The engine ECU 35 controls the output of the engine E. For example, the engine ECU 35 controls an electronic throttle valve 38 for adjusting the amount of intake air introduced into the engine E. The engine ECU 35 informs the electronic throttle valve 38 of the target amount of intake air to adjust the output of the engine E. Additionally, the engine ECU 35 may control the ignition timing of an ignition plug 37 or the amount of fuel injected from a fuel injector 36 in order to adjust the output of the engine E.

The motor ECU 33 receives information such as the remaining charge or the voltage of the battery 18 from a battery management unit (not illustrated) responsible for management of the battery 18, and gives a command to the inverter 19 to control the operation of the electric motor M.

Figure 2:
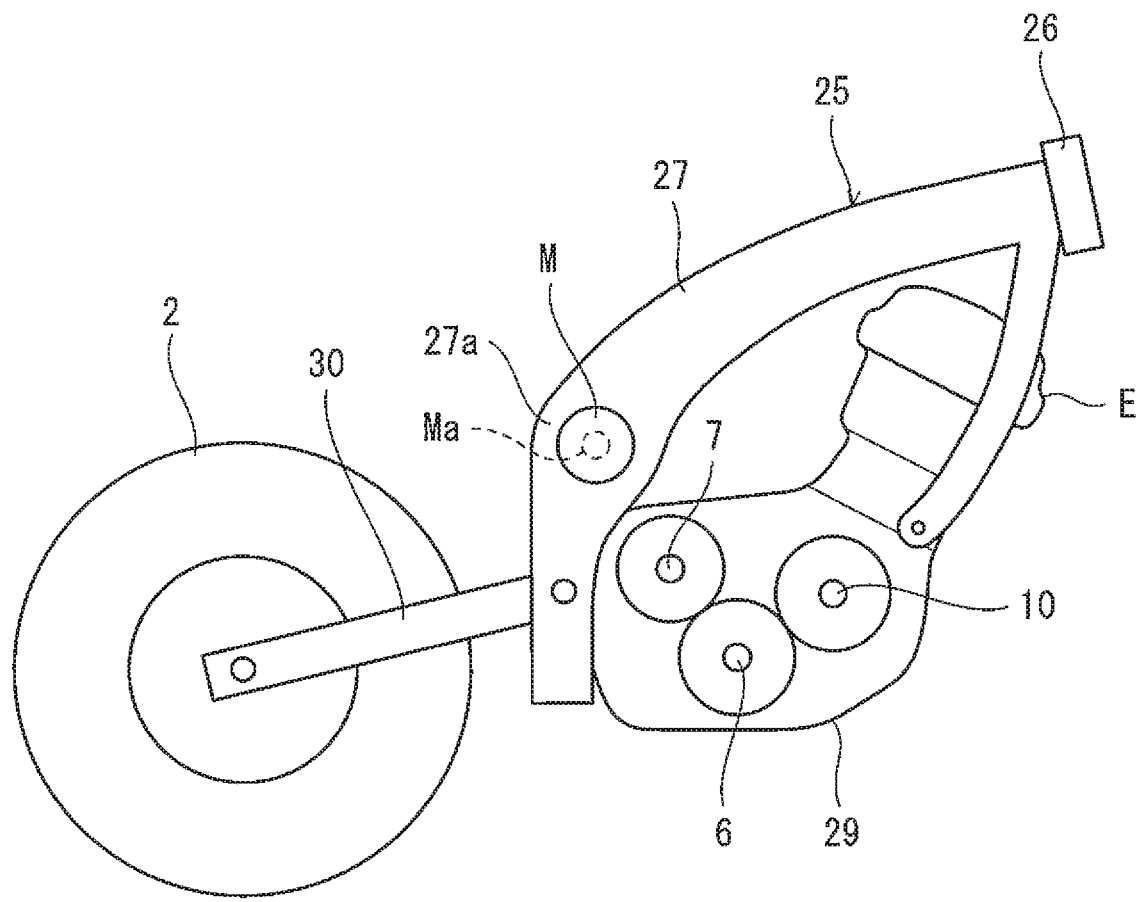
FIG. 2 is a side view of the vehicle of FIG. 1.
Figure 3:
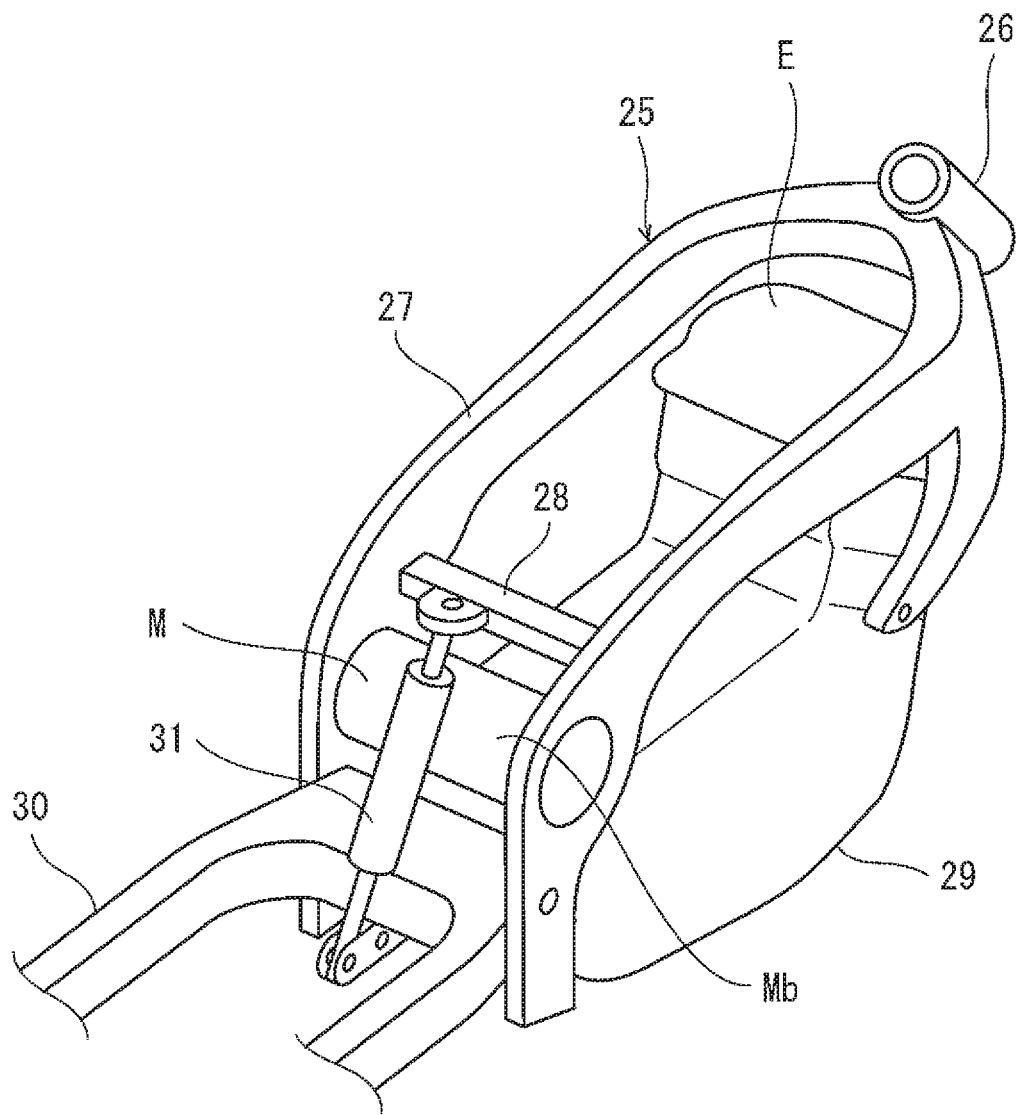
FIG. 3 is a perspective view of the vehicle of FIG. 1.

FIG. 2 is a side view of the vehicle 1 of FIG. 1. FIG. 3 is a perspective view of the vehicle 1 of FIG. 1. As shown in FIGS. 2 and 3, the vehicle 1 includes a vehicle body frame 25. The vehicle body frame 25 includes: a head pipe portion 26 through which a steering shaft is inserted; a pair of frame portions 27 extending rearward from the head pipe portion 26 and spaced apart from each other in the vehicle width direction; and a cross member 28 extending in the vehicle width direction and coupling the pair of frame portions 27 to each other. The engine E and the crankcase 29 are supported by the frame portions 27.

The crankcase 29 houses the crankshaft 10 and the transmission 5 disposed behind the crankshaft 10. A swing arm 30 extending rearward is pivotally coupled at its front end to a rear of the pair of frame portions 27. The drive wheel 2 is pivotally connected to a rear end of the swing arm 30. The swing arm 30 is connected to the cross member 28 by a rear suspension 31.

The electric motor M is separately provided outside the crankcase 29. The electric motor M is disposed outside and away from the crankcase 29. The electric motor M is located above the rear of the crankcase 29. The drive shaft Ma of the electric motor M is located rearward of the input shaft 6 and the output shaft 7. The casing Mb of the electric motor M is also located rearward of the input shaft 6 and the output shaft 7. The electric motor M is located forward of the rear suspension 31.

The electric motor M is placed in such a manner that its drive shaft Ma (see FIG. 1) extends in the vehicle width direction. The opposite end portions of the casing Mb of the electric motor M in the vehicle width direction are fixed to the pair of frame portions 27. Each frame portion 27 has a motor supporting region 27a to which the electric motor M is fixed, and the motor supporting region 27a as viewed in the vehicle width direction is wider than the other regions of the frame portion 27 which are adjacent to the motor supporting region 27a. The electric motor M is disposed at such a location that the electric motor M as viewed in the vehicle width direction is enclosed by the frame portions 27.

FIG. 4 is a table illustrating the respective states of the transmission 5, clutch 12, engine E, and electric motor M of the vehicle 1 of FIG. 1 in different modes. As shown in FIG. 4, the control mode of the vehicle 1 includes an engine-motor-driven travel mode, an engine-driven travel mode, and a motor-driven travel mode. Selection from among the modes is made by the program of the controller 24 or by the user.

In the engine-motor-driven travel mode, the transmission 5 is in an engaged state (non-neutral state where the transmission is in any of the first to sixth gear positions), the clutch 12 is in an engaged state (connection), the engine E is in an operating state, and the electric motor M is in an operating state. That is, the input shaft 6 receives power transmitted both from the engine E and from the electric motor M, and the power is transmitted to the drive wheel 2. Specifically, when the engine-motor-driven travel mode has been selected by the program of the controller 24 or by the user, and the engaged state of the transmission 5 has been detected by the transmission sensor 22, and the engaged state of the clutch 12 has been detected by the clutch sensor 21, the controller 24 puts the engine E and the electric motor M into operation to allow the vehicle to travel using power of both the engine E and the electric motor M.

In the engine-driven travel mode, the transmission 5 is in an engaged state, the clutch 12 is in an engaged state, the engine E is in an operating state, and the electric motor M is in a free run state. The "free run state" refers to a state where the motor circuit is opened so as not to cause resistance due to generation of electromotive force when any power is transmitted to the electric motor M. Specifically, when the engine-driven travel mode has been selected by the program of the controller 24 or by the user, and the engaged state of the transmission 5 has been detected by the transmission sensor 22, and the engaged state of the clutch 12 has been detected by the clutch sensor 21, the controller 24 causes the circuit of the electric motor M to open, and puts the engine E into operation to allow the vehicle to travel using power of the engine E alone.

In the motor-driven travel mode, when at least one of the transmission 5 and the clutch 12 is in a disengaged state, the electric motor M is put into operation to allow the vehicle to travel using power of the electric motor M alone. When the transmission 5 is in an engaged state, the clutch 12 may be either in an engaged state or in a disengaged state, and when the clutch 12 is in an engaged state, the transmission 5 may be either in an engaged state or in a disengaged state.

In the engine-motor-driven travel mode, the engine-driven travel mode, and the motor-driven travel mode, the inertial force of the drive wheel 2 is inputted to the electric motor M via the transmission 5 during deceleration of the vehicle 1. Thus, the controller 24 causes the electric motor M to perform regeneration to charge the battery 18 during deceleration of the vehicle 1.

During the motor-driven travel mode, since at least one of the transmission 5 and the clutch 12 is in a disengaged state, power of the engine E is not transmitted to the output shaft 7 even if the engine E is put into operation. During the motor-driven travel mode, therefore, the engine E may be put into operation to cause the electricity generator G to generate electricity and charge the battery 18 with the generated electricity.

In the motor-driven travel mode where the transmission 5 is in an engaged state and the clutch 12 is in a disengaged state, putting the engine E into operation allows the driver to achieve smooth switching to the engine-motor-driven travel mode by operating the clutch operation member 4 and bringing the clutch 12 into a connection state through a half-clutch state. In the motor-driven travel mode where the transmission 5 is in an engaged state and the clutch 12 is in a disengaged state, stopping the engine E allows the driver to perform hard braking by operating the clutch operation member 4 and bringing the clutch 12 into a connection state during deceleration of the vehicle 1. This hard braking is achieved due to the combination of regeneration of the electric motor M and pumping resistance of the engine E.

Control of the electric motor M in the engine-motor-driven travel mode is different from control of the electric motor M in the motor-driven travel mode. In the engine-motor-driven travel mode, the drive power is not only derived from the engine output but can be adjusted by the electric motor M according to an assistance condition, and thus an output increase can be achieved when high drive power is required. For example, upon detection of an acceleration operation or a starting operation, the drive power can be increased by actuating the electric motor M. For example, when an acceleration operation is performed in a rotational speed range where the output torque is low due to the engine characteristics, the electric motor M may be controlled to provide enhanced output assistance. In particular, when the engine is in a low rotational speed range, such as at the time of the start of the vehicle, lack of the engine output torque during low-speed rotation can easily be compensated for by enhancing output assistance provided by the operation of the electric motor M. When the sinusoidal curve representing the torque of the engine E has a deep valley portion, namely when a rotational speed range exists where a torque increase by the engine is less expected than in other rotational speed ranges, the assistance from the electric motor M may be enhanced at the valley portion of the torque.

The electric motor M may be brought into a free run state when the output assistance from the electric motor M is unnecessary, such as during travel at a constant speed, during a gentle output-increasing operation, and during deceleration. This can reduce the resistance caused by the electric motor M when the assistance from the motor is unnecessary during the engine-motor-driven travel mode. The reduction gear ratios as speed change ratios may be set relatively low on the premise of the output assistance from the electric motor M. Such gear ratio setting can increase the maximum travel speed. A torque decrease arising from the low reduction gear ratios may be compensated for by the assistance from the electric motor M. The electric motor M may be controlled to reduce torsional vibration of the input shaft 6 by taking into consideration a situation where the torsional vibration of the input shaft 6 is likely to occur.

Figure 5:
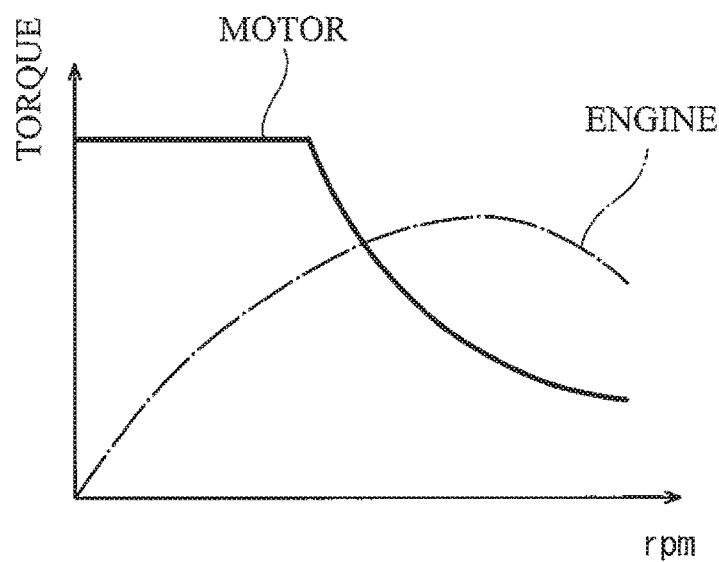
FIG. 5 is a graph showing the relationship between torque and rotational speed of the vehicle of FIG. 1 in an engine-motor-driven travel mode.

FIG. 5 is a graph showing the relationship between torque and rotational speed of the vehicle 1 of FIG. 1 in the engine-motor-driven travel mode. In the engine-motor-driven travel mode, as shown in FIG. 5, the controller 24 varies the torque distribution between the torque generated by the engine E and the torque generated by the electric motor M according to the rotational speed. Specifically, since the torque curve of the engine E depends on the engine design, the controller 24 regulates the torque generated by the electric motor M to adjust the torque distribution. The controller 24 controls the electric motor M so that a torque generated at a low rotational speed lower than a predetermined threshold is higher than a torque generated at a high rotational speed equal to or higher than the threshold.

Figure 6:
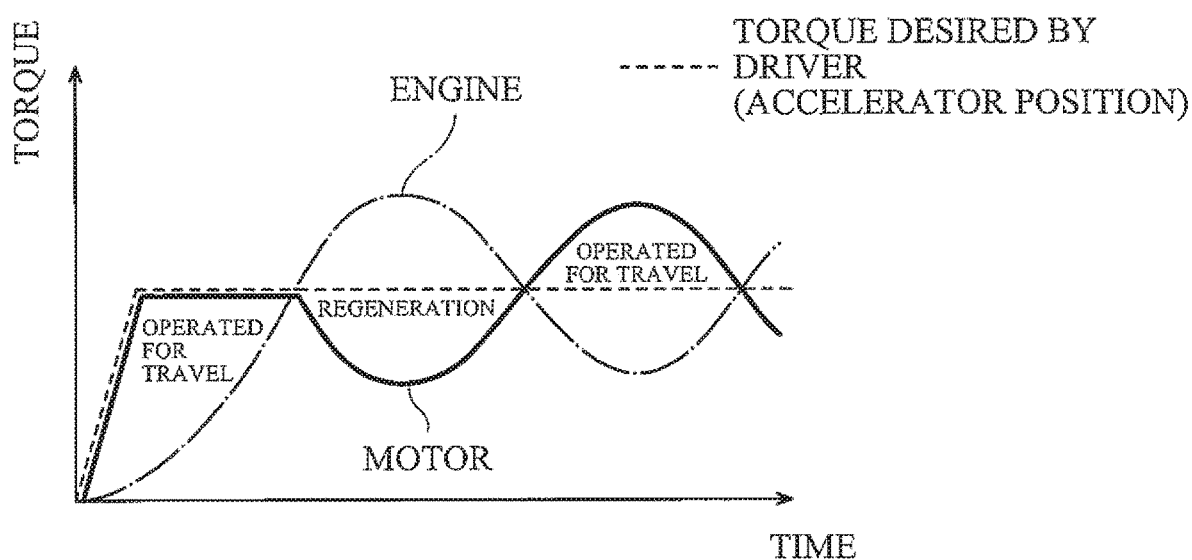
FIG. 6 is a graph showing the relationship between torque and time of the vehicle of FIG. 1 in the engine-motor-driven travel mode.

FIG. 6 is a graph showing the relationship between torque and time of the vehicle 1 of FIG. 1 in the engine-motor-driven travel mode. Since the torque generated by the engine E varies sinusoidally with time as shown in FIG. 6, there occurs a deviation from a torque desired by the driver (e.g., accelerator position). When the torque generated by the engine E is lower than the torque desired by the driver, the controller 24 puts the electric motor M into operation and controls the electric motor M so that the total of the torque generated by the engine E and the torque generated by the electric motor M comes close to the torque desired by the driver. When the torque generated by the engine E is higher than the torque desired by the driver, the controller 24 causes the electric motor M to perform regeneration and controls the electric motor M so that the total of the torque generated by the engine E and the regenerative torque of the electric motor M comes close to the torque desired by the driver.

With the configuration described above, when the electric motor M is in operation, transmission of power from the electric motor M to the crankshaft 10 of the engine E can be prevented by cutting off the power transmission route between the engine E and the output shaft 7 using the neutral shift mechanism of the transmission 5 or using the clutch 12, and for this purpose the transmission 5 or the clutch 12 disposed between the engine E and the output shaft 7 can be used. Thus, energy loss occurring when the drive wheel 2 is driven by the electric motor M alone can be reduced with a simple configuration.

Additionally, in the motor-driven travel mode, shifting the transmission 5 into the neutral position can prevent rotation of power transmission members (e.g., the input shaft 6, the first power transmission mechanism 11, and the engine E) closer to the engine E than the output shaft 7 and decrease the number of members rotating in mesh for power transmission, thereby reducing noise which occurs due to meshing of the gears during travel.

Additionally, since the electric motor M is separately provided outside the crankcase 29 housing the transmission 5, the basic vehicle structure can be standardized between the hybrid vehicle 1 incorporating the electric motor M and an internal combustion engine vehicle incorporating no electric motor. Further, since the electric motor M transmits power to the output shaft 7 at a location outside the crankcase 29, components of the crankcase 29 can be standardized between the hybrid vehicle 1 incorporating the electric motor M and an internal combustion engine vehicle incorporating no electric motor. That is, a hybrid vehicle can be constructed without having to significantly change the power transmission structure of an engine vehicle.

Additionally, since the electric motor M is disposed above the rear of the crankcase 29, the influence of heat of the engine E on the electric motor M can be reduced. Further, since the electric motor M is disposed outside and away from the crankcase 29, heat transfer from the crankcase 29 to the electric motor M can be reduced compared to when the electric motor M is supported in contact with the crankcase 29.

Additionally, since the electric motor M is controlled based on outputs from the clutch sensor 21, control of the electric motor M can be accomplished according to commands given by the driver concerning the clutch 12. Further, since the opposite end portions of the casing Mb of the electric motor M in the vehicle width direction are supported by the pair of frame portions 27, supporting of the electric motor M is simplified, and the casing Mb of the electric motor M can serve also as a reinforcing member coupling the pair of frame portions 27.

Figure 7:
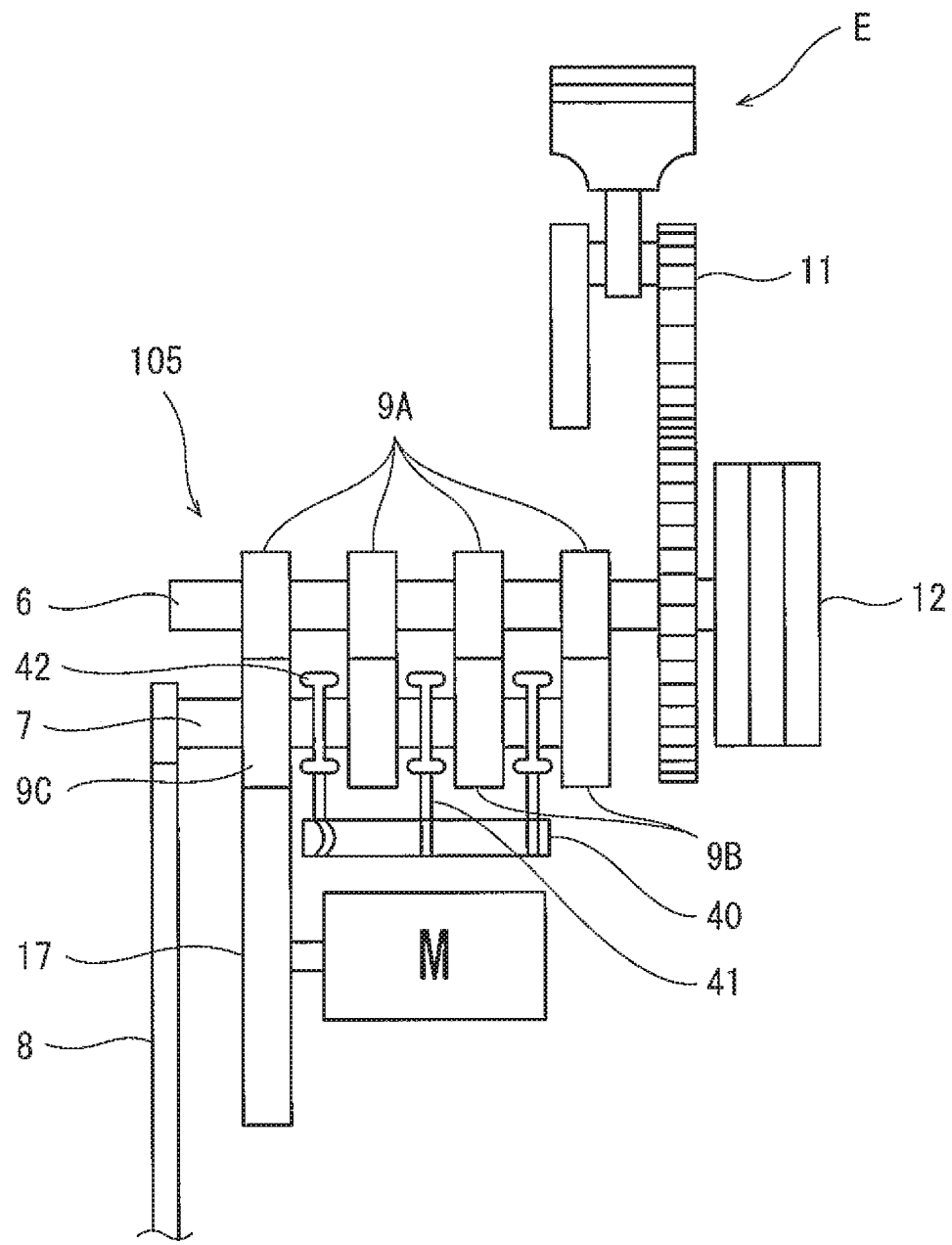
FIG. 7 is a block diagram showing a modified example of the manner of connection of an electric motor.

The manner of connection of the electric motor M to the output shaft 7 may be different from that described above. FIG. 7 is a block diagram showing a modified example of the manner of connection of the electric motor M. In a transmission 105 shown in FIG. 7, gears 9A provided on the input shaft 6 are fitted on the input shaft 6 so as to corotate with the input shaft 6, while gears 9B and 9C provided on the output shaft 7 are rotatably fitted on the output shaft 7 so as to rotate independently of the output shaft 7. The gears 9B and 9C provided on the output shaft 7 are constantly in mesh with the gears 9A provided on the input shaft 6. Dog rings 42 provided on the output shaft 7 are fitted on the output shaft 7 so as to corotate with the output shaft 7. Upon rotation of a shift drum 40, a shift fork 41 moves along the output shaft 7 to cause the dog ring 42 to engage with one gear selected from the plurality of gears 9B and 9C, and the engaged gear corotates with the output shaft 7.

The electric motor M is connected to the gear 9C (rotating member) which is one of the gears 9B and 9C provided on the output shaft 7 via the second power transmission mechanism 17, so that power is constantly transmitted from the electric motor M to the gear 9C. When the dog ring 42 is not engaged with the gear 9C, the gear 9C rotates independently of the output shaft 7. Thus, power of the electric motor M is transmitted to the input shaft 6 via the gear 9C and gear 9A, and the resulting rotation of the input shaft 6 is transmitted to the output shaft 7 via the gear 9B corresponding to the desired gear position and engaged with the dog ring 42. That is, with the configuration of FIG. 7, the electric motor M can transmit power to the input shaft 6 through a route different from the route through which power from the engine E is transmitted to the input shaft 6. When the dog ring 42 is engaged with the gear 9C, the gear 9C corotates with the output shaft 7. Thus, power transmitted from the electric motor M to the gear 9C can be directly transmitted to the output shaft 7.

Since the electric motor M is disposed to the output side of the transmission 105, the electric motor M can be located away from the engine E, and the adverse effect of heat generated by the cylinder of the engine E on the electric motor M can be reduced. Additionally, interference between the electric motor M and components provided around the cylinder such as a throttle body and an air cleaner can easily be prevented. In this case, depending on the angular position of the shift drum 40, a state where power is not transmitted from the electric motor M to the output shaft 7 can be established, for example, by shifting the transmission 105 into the neutral position. Thus, shifting the transmission 105 into the neutral position can prevent a situation where power from the engine E is transmitted to the electric motor M and power from the electric motor M is transmitted to the drive wheel 2. This allows execution of an electricity generation mode in which the electric motor M is rotationally driven by the engine E to generate electricity.

Figure 8:
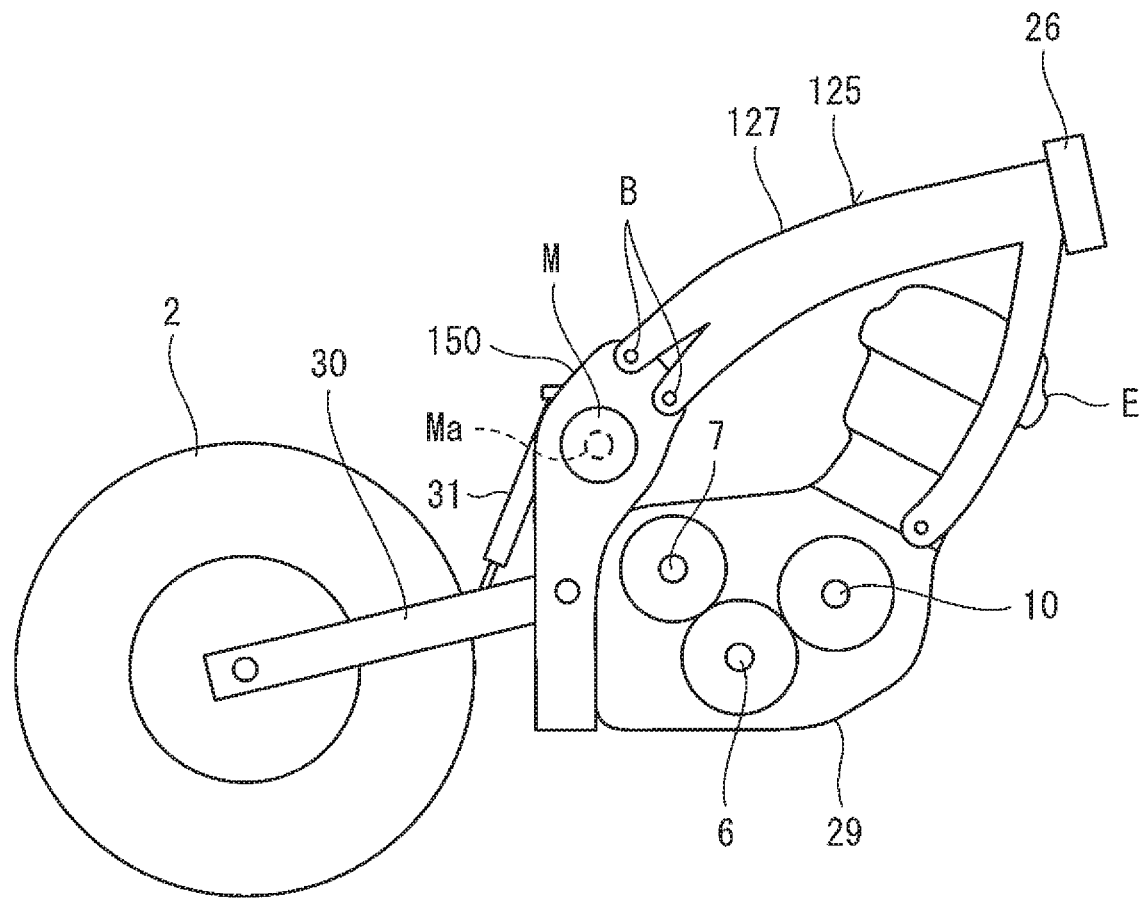
FIG. 8 is a side view showing a modified example of the manner of supporting of an electric motor.

The manner of supporting of the electric motor M may be different from that described above. FIG. 8 is a side view showing a modified example of the manner of supporting of the electric motor M. As shown in FIG. 8, the electric motor M disposed away from the crankcase 29 is supported by a motor supporting frame 150. The motor supporting frame 150 is provided separately from the pair of frame portions 127 which extend rearward from the head pipe portion 26 and which are spaced apart from each other in the vehicle width direction. The motor supporting frame 150 is fixed to the frame portions 127 by fastening members B (e.g., bolts). The motor supporting frame 150 serves also as a pivot frame that pivotally supports the swing arm 30. The motor supporting frame 150 is fixed to the crankcase 29 by fastening members. The motor supporting frame 150 may constitute a part of the crankcase 29.

The present invention is not limited to the embodiments described above, and an element may be modified, added, or omitted. For example, a manual gear shifting power transmission mechanism that delivers an operation force of the driver as clutch actuation power to the clutch may be provided, and a controlled clutch actuation power transmission mechanism that delivers power of a clutch actuator (e.g., a hydraulic pressure pump or a motor) as clutch actuation power to the clutch may be provided in addition to the manual power transmission mechanism. A manual gear shifting power transmission mechanism that delivers an operation force of the driver as gear shifting power to the transmission may be provided, and a controlled gear shifting power transmission mechanism that delivers power of a gear shifting actuator as gear shifting power to the transmission may be provided in addition to the manual gear shifting power transmission mechanism. The controller can put the clutch actuator or the gear shifting actuator into operation to switch the travel mode from one to another irrespective of operations by the driver. Thus, the controller can perform switching to the engine-driven travel mode when, for example, high output is required but the remaining charge of the battery is small.

The clutch sensor may be a sensor that detects the motion of the clutch operation member 4 operated by the driver (clutch actuation command). The transmission sensor 22 may be a sensor that detects the motion of the shift operation member operated by the driver (gear shifting operation command). The electric motor M may be disposed rearward of the rear of the crankcase 29. Also in this case, it is advantageous that the electric motor M be supported by the pair of frame portions 27.

The output power transmission mechanism 8 for output transmission from the output shaft 7 to the drive wheel 2 may be provided at one side of the output shaft 7 in the axial direction of the output shaft 7, while the second power transmission mechanism 17 for power transmission from the electric motor M to the output shaft 7 may be provided at the opposite side of the output shaft 7 in the axial direction. In this case, interference between the output power transmission mechanism 8 and the second power transmission mechanism 17 can be prevented, and replacement and maintenance of these mechanisms can be made easy.

Since the electric motor M can transmit power to one of the gear trains of the transmission that has a high reduction gear ratio, the torque transmitted from the electric motor M to the output shaft 7 can be increased while the size of the electric motor M is reduced. The vehicle may be equipped with mode selection switches operated by the driver. In the motor-driven travel mode, the electric motor M may be brought into a free run state in response to a clutch operation in order to make the handling feeling closer to that in the engine-driven travel mode.

REFERENCE CHARACTERS LIST

1 Hybrid vehicle
2 Drive wheel
5 Transmission (power cutting-off mechanism)
6 Input shaft
7 Output shaft
7a End portion
8 Output power transmission mechanism
12 Clutch (power cutting-off mechanism)
21 Clutch sensor
24 Controller
25 Vehicle body frame
27 Frame portion
29 Crankcase
E Engine (internal combustion engine)
M Electric motor
Ma Drive shaft
Mb Casing

The invention claimed is:

1. A hybrid vehicle including a saddle, the hybrid vehicle comprising:
   an internal combustion engine;
   an electric motor;
   a transmission comprising an input shaft that receives power inputted from the internal combustion engine and the electric motor and an output shaft that outputs power to a drive wheel;
   a clutch configured to cut off a power transmission route between the internal combustion engine and the input shaft;
   a power transmission mechanism configured to transmit power from the electric motor to the output shaft; and
   an output power transmission mechanism configured to transmit power from the output shaft to the drive wheel, wherein
   the electric motor is connected to a rotating member provided on the output shaft in such a manner that the electric motor transmits power to the output shaft at a location downstream of the input shaft,
   at least one of the transmission and the clutch is in a disengaged state when the vehicle travels using power of the electric motor alone, and
   a first route from the output shaft to the output power transmission mechanism and a second route from the output shaft to the electric motor are branched on the output shaft.

2. The hybrid vehicle according to claim 1, further comprising:
   a sensor that detects which state the clutch is in or detects a command to actuate the clutch; and
   a controller that controls the electric motor based on an output from the sensor.

3. The hybrid vehicle according to claim 1, wherein the electric motor is separately provided outside a crankcase housing the transmission.

4. The hybrid vehicle according to claim 1, wherein the electric motor is disposed above, or rearward of, a rear of a crankcase housing the transmission.

5. The hybrid vehicle according to claim 4, wherein the electric motor is disposed outside and away from the crankcase.

6. The hybrid vehicle according to claim 1, wherein the transmission is in the disengaged state when the vehicle travels using power of the electric motor alone.

7. The hybrid vehicle according to claim 1, wherein the clutch is in the disengaged state when the vehicle travels using power of the electric motor alone.

8. The hybrid vehicle according to claim 1, further comprising:
   a first sensor that detects which state the clutch is in or detects a command to actuate the clutch; and
   a second sensor that detects which state the transmission is in; and
   a controller that controls the electric motor based on outputs from the first sensor and the second sensor, wherein
   when a motor-driven travel mode has been selected by the controller or by a user, the electric motor is put into operation to allow the vehicle to travel using power of the electric motor alone with at least one of the transmission and the clutch detected in the disengaged state.

9. A hybrid vehicle comprising:
   an internal combustion engine;
   an electric motor;
   a transmission comprising an input shaft that receives power inputted from the internal combustion engine and the electric motor and an output shaft that outputs power to a drive wheel;
   a power cutting-off mechanism configured to cut off a power transmission route between the internal combustion engine and the output shaft; and
   an output power transmission mechanism that transmits power from the output shaft to the drive wheel, wherein
   the electric motor is connected to a rotating member provided on the output shaft in such a manner that the electric motor transmits power to the output shaft at a location downstream of the power cutting-off mechanism,
   an end portion of the output shaft projects to one side in a vehicle width direction from a crankcase housing the transmission,
   the output power transmission mechanism is connected to the end portion of the output shaft, and
   the electric motor inputs power to the end portion of the output shaft.

10. The hybrid vehicle according to claim 9, further comprising:
    a power transmission mechanism configured to transmit power from the electric motor to the output shaft;
    an output power transmission mechanism configured to transmit power from the output shaft to the drive wheel, wherein
    a first route from the output shaft to the output power transmission mechanism and a second route from the output shaft to the electric motor are branched on the output shaft.

11. A hybrid vehicle comprising:
an internal combustion engine;
an electric motor;
a transmission comprising an input shaft that receives power inputted from the internal combustion engine and the electric motor and an output shaft that outputs power to a drive wheel;
a power cutting-off mechanism configured to cut off a power transmission route between the internal combustion engine and the output shaft; and
a vehicle body frame comprising a pair of frame portions spaced apart from each other in a vehicle width direction, wherein
the electric motor is connected to a rotating member provided on the output shaft in such a manner that the electric motor transmits power to the output shaft at a location downstream of the power cutting-off mechanism,
the electric motor is disposed in such a manner that a drive shaft of the electric motor extends in the vehicle width direction, and
opposite end portions of a casing of the electric motor in the vehicle width direction are supported by the pair of frame portions.

12. The hybrid vehicle according to claim 11, wherein
each of the frame portions includes a motor supporting region to which the electric motor is fixed, and
the motor supporting region as viewed in the vehicle width direction is wider than the other regions of the frame portion which are adjacent to the motor supporting region.

* * * * *